(1)

United States Patent Office 3,218,307
Patented Nov. 16, 1965

3,218,307
PROCESS OF PRODUCING SOYBEAN
PROTEINATE
Arthur C. Eldridge, Morton, and Arlo M. Nash, Peoria,
Ill., assignors to the United States of America as represented by the Secretary of Agriculture
No Drawing. Filed Aug. 1, 1961, Ser. No. 128,597
3 Claims. (Cl. 260—123.5)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This application is a continuation-in-part of application S.N. 41,213, filed July 6, 1960, now abandoned.

This invention relates to novel soybean protein products and to compositions therewith. It is believed that our herein described novel products, which are proteinaceous and contain 15.5 to 17.0 percent nitrogen, constitute the first instance of a vegetable-derived protein that can form edible and esthetically acceptable thermo-reversible hydrogels having characteristics that are similar to those of the traditional commercial dessert gelatin of animal origin.

More particularly, this invention pertains to the products obtained by treating (extracting) the acid-precipitated (isoelectric) soybean protein fraction obtained by acidifying the separated aqueous supernatant of a neutral or slightly alkaline aqueous dispersion or slurry of hexane-extracted soybean meal with a lower alcohol or an aqueous solution thereof.

The alcohol extraction treatment of hexane-extracted soybean meal to remove an "anti-whipping" or "anti-gelling" factor is taught by Beckel et al., U.S. 2,444,241, De Voss et al., U.S. 2,495,706, and Belter et al., U.S. 2,635,094, but the foams or whips made with the products of the above patents are much less stable than foams or whips made with the products of our invention, and most importantly, hydrogels prepared with these prior art products are not heat-reversible, as is explicitly pointed out in De Voss, U.S. 2,495,706 and in Beckel et al., U.S. 2,561,333. This is in sharp contrast to our product which forms thermo-reversible hydrogels.

Only little commercial interest has been shown in the prior art soybean-derived hydrogel-forming products mainly because they lack the heat-reversible characteristics of the long established animal-derived gelatin dessert products. Thus, for example, hydrogels formed from the prior art soybean-derived protein fail to loosen from a mold under the brief influence of warm water. In contrast thereto, hydrogels prepared from our novel products exhibit this desirable property of the animal-derived protein, and thus are the first instance of a vegetable-derived thermo-reversible gel-forming protein product.

Our novel and improved soybean protein products have a wide spectrum of utilities in addition to that of forming repeatedly thermo-reversible hydrogels for human consumption. For example, they form exceptionally stable whips in which the alcohol debittered blandness may be very readily modified by the addition of vanilla or other food flavorings. When baked, these whips become form-retaining, porous materials capable of use in confections. In addition, aqueous dispersions or solutions of our products have wide applications in adhesives, as emulsifying agents, as thickening agents or protective colloids, and as low cost but highly nutritive protein supplements for meat products, salads, puddings, etc. In addition, when plasticized with glycerol, our products form clear, highly flexible films which can be employed as a hot water or steam-soluble coating for meats or other foodstuffs. In addition, solutions of our alcohol-extracted soybean fraction have been found to be excellent sizing and coating agents for paper.

As indicated above, it is known to treat hexane-extracted soybean meal with various lower aliphatic alcohols to remove a phospholipid "antigelling" and "antiwhipping" factor, to thus provide a soybean product which, respectively, on aqueous extraction or resuspension solution in water, can be whipped into a rather stable foam or made into an irreversible gel.

The principal object of our invention is the preparation of alcohol-extracted soybean protein material which under certain specific conditions forms edible thermo-reversible hydrogels. Another object is a method of preparing such heat-reversible hydrogels therefrom.

The above and other objects will be apparent in the following detailed disclosure.

In the present invention we have now discovered that by treating only the acid (isoelectrically) precipitated fraction of an aqueous whole extract of hexane-extracted soybean meal with certain critical ranges of lower alcohols, not only is an antigelling factor removed therefrom as expected, but we have unexpectedly also found that the alcohol-washed said fraction possesses greatly improved properties over the similarly treated prior art whole extract mixture of water-soluble soybean proteins. The most conspicuously different property is evident in the repeatedly thermo-reversible character of hydrogels that are prepared by heating certain essential concentrations of the alkali-dispersed alcohol-treated product (alkali proteinate) of our invention. Although applicants do not intend to be responsible for the accuracy of the following theory, it is believed that the heat reversibility of their improved soybean product depends on the presence of protein that is more resistant to heat coagulation and upon the absence of a heat-sensitive component present in the prior art products. Another difference over the prior art soybean protein products is the distinctly increased stability of whipped foams therewith. The flavor and color of our products are also superior to those of the said prior art products.

We have found the following alcohol concentrations to be highly effective: methanol 80–100 percent by volume (95 percent v./v. preferred); ethanol 60–95 percent by volume (86 percent v./v. preferred); isopropanol 40–95 percent by volume (82 percent v./v. preferred).

To prepare our product, it is a matter of choice whether one starts with a highly pure commercial acid-precipitated soybean protein or whether one prepares such acid-precipitated protein and treats it as part of a drying operation in the manner of Example 1.

*Example 1*

200 g. of hexane-extracted soybean meal were mechanically stirred in 2000 ml. of water and the suspension was repeatedly adjusted to pH 7.4–7.6 with alkali during the one-hour of stirring. The suspension was then centrifuged, and the separated solids were stirred in another 1000 ml. of water for 30 minutes before centrifuging.

The two centrifugation supernatants were combined, and HCl was added to lower the pH to 4.2–4.7. The precipitated protein was isolated by centrifiguration, and the moist curd (56 g. dry basis) was dispersed 5 separate times in 300 ml. portions of 85 percent (v./v.) aqueous ethanol in a blender. Then the filtered ethanol-moist cake was vacuum-dried at 30° C., yielding 53.2 g. of material which, for convenience, was then dispersed in alkali (pH 7.5), the residue from centrifuging was discarded, and the solubles were freeze-dried to yield our alcohol-treated sodium proteinate product.

*Example 2*

The sodium proteinate product of Example 1 was treated in the following manner: 1.0 g. thereof was placed in each of 8 test tubes and 4–20 ml. of water was added as shown in Table I to provide solids concentrations ranging from 4.8 percent to 20.0 percent. The proteinate was dissolved by stirring, and the tubes were placed in a boiling water bath. As shown in Table I sodium proteinate concentrations of 12.2 percent gelled even when hot (i.e., became irreversible) while the 11.5 percent concentration was gelled when cooled to or below 68° C. after 5 minutes of heating at 92° C. The last described gel again became fluid (poured freely from its test tube) upon warming to 75° C., regelled upon cooling to 68° C., and liquified upon rewarming to 75° C. Similar results were obtained when various food dyes or flavors were added to the proteinate solution.

TABLE I

| Tube | Wt. material added, g. | H$_2$O added, ml. | Solids, percent concentration | Comments |
|---|---|---|---|---|
| 1 | 1.0 | 4.0 | 20.0 | Boiling H$_2$O, 3 minutes, gave gel while hot. |
| 2 | 1.0 | 5.0 | 16.7 | Do. |
| 3 | 1.0 | 6.0 | 14.3 | Do. |
| 4 | 1.0 | 7.1 | 12.2 | Boiling H$_2$O, 5 minutes, gelled while hot. |
| 5 | 1.0 | 7.7 | 11.5 | Boiling H$_2$O, 5 minutes, was gelled at 28° C. |
| 6 | 1.0 | 9.0 | 10.0 | Boiling H$_2$O, 5 minutes, no gel hot, gelled in an ice bath. |
| 7 | 1.0 | 10.0 | 9.1 | Boiling H$_2$O, 10 minutes, no gel hot, slight gel in an ice bath. |
| 8 | 1.0 | 20.0 | 4.8 | Boiling H$_2$O, 10 minutes, no gel hot, no gel in an ice bath. |

*Example 3*

10 g. of our alcohol-treated sodium proteinate was stirred in 100 ml. of water for 30 minutes, and a clear supernatant was then isolated by centrifuging. The supernatant was divided into two parts and glycerol amounting to 4 percent was added to one part as a plasticizer. Films of each were poured onto a waxed steel plate and allowed to dry at room temperature. The glycerol-containing dry film was faintly yellow, highly transparent, very flexible, and water-soluble. The film containing no plasticizer appeared the same as the other but was very brittle and shattered upon being touched.

*Example 4*

Conventional acid-precipitated soybean protein was divided into two parts. One part was dried in a vacuum oven at 40° C. The other part was washed in 25 volumes of 86 percent (v./v.) ethanol. Paper coating compositions were prepared by suspending 10 g. of each sample in 46 ml. of water, then adding 14 ml. of a 5 percent sodium carbonate solution to obtain a pH of 8.3–8.6, warming the suspensions in a 50° C. water bath for 20 minutes with frequent stirring, and adding the resulting smooth paste to a clay slip formed by stirring 40 g. of coating clay and 62 ml. of water until smooth. For comparison a coating composition was prepared using a commercially available, pure isolated soya protein that is widely used as a paper coating. Sheets of unsized paper were coated with the respective coating preparations and hung to dry for 24 hours. The results of standard reflectance (brightness) and adherence ("pick") tests are shown in Table II.

TABLE II

| Soya protein | Reflectance [1] percent | "Pick" test |
|---|---|---|
| Commercial highly purified | 66.2 | 6–8 |
| Oven-dried acid precipitated | 65.4 | 8.9 |
| EtOH-washed acid precipitated | 70.0 | 7–8 |

[1] Freshly deposited MgO is reference standard; average of 3 runs, 5 reading per run.

Having disclosed our invention, we claim:

1. The soybean proteinate produced by treating, with an aliphatic alkanol from the group consisting of methanol, ethanol, and isopropanol, the isoelectrically precipitated protein fraction from a solution obtained by extracting a hexane-extracted soybean meal with a member of the group consisting of water and aqueous alkali, said methanol being in a concentration of about from 80 to 100% by volume, said ethanol being in a concentration of about from 60 to 95% by volume, and said isopropanol being in a concentration of about from 40 to 95% by volume, drying the precipitate to remove the alkanol, dispersing the dry material in alkali at about pH 7.5, centrifuging and freeze-drying to obtain the final product.

2. A method of forming a thermo-reversible gel comprising the steps of heating a 11.5 percent by weight aqueous dispersion of the product of claim 1, in a boiling water bath for 5 min., and cooling the solution to about 68° C.

3. The process for producing a soybean protein fraction capable of forming reversible gels comprising:
 (a) extracting a hexane-extracted soybean meal with a member of the group consisting of water and aqueous alkali;
 (b) acidifying the so obtained extract until the isoelectric point of the proteins contained in said extract is reached to precipitate said proteins;
 (c) treating said precipitated proteins with an aliphatic alkanol of the group consisting of methanol, ethanol, and isopropanol, said methanol being in a concentration of about from 80 to 100% by volume, said ethanol being in a concentration of about from 60 to 95% by volume, and said isopropanol being in a concentration of about from 40 to 95% by volume;
 (d) drying the treated precipitate to remove the alkanol;
 (e) dispersing the dry material in alkali at apout pH 7.5;
 (f) centrifuging the dispersion to separate remaining solids;
 (g) freeze-drying the dispersion to obtain the final product.

References Cited by the Examiner

UNITED STATES PATENTS

| | | | |
|---|---|---|---|
| 2,377,853 | 6/1945 | Boyer | 260—123.5 |
| 2,444,241 | 6/1948 | Beckel | 260.123.5 XR |
| 2,495,706 | 1/1950 | De Voss | 260—123.5 XR |
| 2,635,094 | 4/1953 | Belter | 260—123.5 |
| 2,785,155 | 3/1957 | Anson | 260—123.5 |
| 3,043,826 | 7/1962 | Beaber et al. | 260—123.5 |

OTHER REFERENCES

Belter et al., abstract of application, S.N. 138,528, 659 O.G. 1106–7 (June 1952).

WILLIAM H. SHORT, *Primary Examiner.*

LEON ZITVER, *Examiner.*